United States Patent [19]

Yoshiga et al.

[11] 4,264,010

[45] Apr. 28, 1981

[54] HEAT SHRINKABLE POLYVINYL CHLORIDE FILM

[75] Inventors: Norio Yoshiga; Hiroshi Nakamura; Mototaka Ohmura, all of Nagahama, Japan

[73] Assignee: Mitsubishi Plastics Industries, Ltd., Tokyo, Japan

[21] Appl. No.: 35,716

[22] Filed: May 3, 1979

[30] Foreign Application Priority Data

Oct. 4, 1978 [JP] Japan .................................. 53/122413
Oct. 4, 1978 [JP] Japan .................................. 53/122414

[51] Int. Cl.³ .......................... B65D 65/00; B32B 1/08
[52] U.S. Cl. .................................... 206/497; 206/432; 260/29.6 R; 428/36; 428/500; 428/522; 428/910; 526/330
[58] Field of Search ................. 428/36, 500, 910, 522; 264/DIG. 71, 342 R, 288, 289, 291; 206/432, 497, 525; 156/85; 260/29.6 R, 42, 899; 526/330

[56] References Cited

U.S. PATENT DOCUMENTS

| | | | |
|---|---|---|---|
| 3,022,543 | 2/1962 | Baird, Jr. et al. | 428/36 |
| 3,915,301 | 10/1975 | Gray et al. | 206/497 |
| 4,003,963 | 1/1977 | Creasy et al. | 264/289 |

*Primary Examiner*—Paul J. Thibodeau
*Attorney, Agent, or Firm*—Oblon, Fisher, Spivak, McClelland & Maier

[57] ABSTRACT

A heat shrinkable polyvinyl chloride film which shrinks more than 60% in one direction or more than 80% as an area shrinkage is prepared by stretching a film comprising 5 to 20 wt. parts of a vinyl chloride-vinyl acetate type copolymer having a vinyl acetate content of 10 to 15 wt. % and an average polymerization degree of more than 700 and 100 wt. parts of polyvinyl chloride at a special high stretch ratio.

6 Claims, No Drawings

HEAT SHRINKABLE POLYVINYL CHLORIDE FILM

BACKGROUND OF THE INVENTION

1. FIELD OF THE INVENTION:

The present invention relates to a heat shrinkable polyvinyl chloride film. More particularly, it relates to a heat shrinkable polyvinyl chloride film which is suitable for a contact-packaging of a complicate shaped product such as a bottle, a cup, a vessel and other products.

2. DESCRIPTION OF THE PRIOR ARTS:

Recently, it has been required to use highly heat shrinkable films for contact-packagings depending upon developments of large size containers and irregular shaped products.

In order to attain a contact-packaging of a large size product having complicated shape such as a large bottle for carbonated beverage having a thin neck and a large body and a cup of cup noodles, it is necessary to obtain a highly heat shrinkable film. The known heat shrinkable polyvinyl chloride film has not enough high shrinkage. When the film is stretched at high stretch ratio, a tearing or a whitening of a film is caused in the stretching operation and a practically valuable film could not be obtained in such high stretching operation.

SUMMARY OF THE INVENTION

It is an object of the present invention to provide a highly heat shrinkable polyvinyl chloride film which is suitable for a contact-packaging of an article having a complicated shape such as a bottle, a cup for cup noodles and other products having a complicated shape.

It is another object of the present invention to provide a highly heat shrinkable film which has high shrinkage and high tensile strength.

The foregoing and other objects of the present invention have been attained by providing a highly heat shrinkable polyvinyl film which shrinks more than 60% in one direction or more than 80% as an area shrinkage by forming a film comprising 5 to 20 wt. parts of a vinyl chloride-vinyl acetate type copolymer having a vinyl acetate content of 10 to 15 wt.% and an average polymerization degree of more than 700 and 100 wt. parts of polyvinyl chloride and stretching it at special high stretch ratio.

DETAILED DESCRIPTION OF THE PREFERRED EMBODIMENTS

When a uniaxially heat shrinkable film is prepared, the film comprising 5 to 20 wt. parts of a vinyl chloride-vinyl acetate type copolymer and 100 wt. parts of polyvinyl chloride is stretched at a stretch ratio of 3.5 to 5 times in one direction and at a stretch ratio of less than 1.5 time in the perpendicular direction.

When a biaxially heat shrinkable film is prepared, the film is stretched at a total of stretch ratios in longitudinal direction and in transversal direction, of 5.5 to 7.0 times and each stretch ratio of more than 1.5 times.

Suitable polyvinyl chloride used in the present invention include homopolymers of vinyl chloride and copolymers of vinyl chloride and less than 20 wt.% of a comonomer which have an average polymerization degree of more than 700.

The comonomers can be known monomers which can be easily copolymerizable with vinyl chloride (beside vinyl acetate). A mixed resin can be used and a homopolymer of vinyl chloride is preferable.

The vinyl chloride-vinyl acetate copolymers used in the present invention are the vinyl chloride-vinyl acetate copolymers having a vinyl acetate content of 10 to 15 wt.% and an average polymerization degree of more than 700.

When a vinyl chloride-vinyl acetate copolymer having an average polymerization degree of less than 700 or a vinyl acetate content of less than 10 wt.% or more than 15 wt.% is incorporated, a tearing or a whitening of the film is caused in the stretching operation and the desired heat shrinkable polyvinyl chloride film can not be obtained.

In the present invention, a content of the specific vinyl chloride-vinyl acetate type copolymer is preferably in a range of 5 to 20 wt. parts especially 10 to 15 wt. parts to 100 wt. parts of polyvinyl chloride.

When the content of the specific vinyl chloride-vinyl acetate type copolymer is less than 5 wt. parts the improved effect for stretching is not expected and a tearing or a whitening of the film is caused in the stretching operation. When it is more than 20 wt. parts, the effect for stretching is inferior and the effect of the addition is inferior. Therefore, it is preferable in a range of 5 to 20 wt. parts.

It is possible to incorporate suitable additives such as a lubricant, a thermal stabilizer, an antielectrostatic agent, an ultraviolet absorber and a plasticizer in the composition for the film.

The highly heat shrinkable polyvinyl chloride film of the present invention can be prepared by melt-extruding the composition through a desired conventional die and stretching at said special stretch ratio in one direction or two directions by the conventional stretching method. As one example, the film may be stretched in a stretching zone at 60°–100° C.

In the preparation of a unixially stretching film the stretch ratio is preferably in a range of 3.5 to 5 times especially 3.5 to 4.5 times. When it is less than 3.5 times, the shrinkage is less than 60% and it is difficult to use the film to attain a contact-package of a large size bottle so as to cover from body to neck. On the contrary, when it is greater than 5 times, a shrinkage is not further improved and a tearing or a whitening of the film is caused in the stretching operation and a practically valuable film is not obtained.

It is preferable to stretch at a stretch ratio of 3.5 to 4.5 to prevent a tearing or a whitening. When it is stretched at a stretch ratio of more than 4, a film having a shrinkage of more than 65% in the direction may be obtained.

The resulting heat shrinkable polyvinyl chloride film has high shrinkage and has excellent optical characteristics and can be used for packaging a large size bottle, a large size container or an irregular shaped container by the contact-packaging to provide excellent appearance in a heat shrunk packaging.

It is preferable to give the shrinkage of more than 65% in one direction which may be attained by stretching the specific film at a stretch ratio of more than 4.0 times in one direction.

When it is required to give a slight heat shrinkability to the other direction of the polyvinyl chloride film for the purpose of a prevention of a sag, it is possible to stretch in the perpendicular direction at a stretch ratio of less than 1.5 times especially about 1.05 to 1.2 times to form a special biaxially stretched film having a shrinkage of 5 to 20%. When a stretch ratio is greater than 1.5 times, the following biaxially stretched film is prepared.

In the preparation of a biaxially stretched film, a total of a stretch ratio in one direction and a stretch ratio in the perpendicular direction is preferably in a range of 5.5 to 7.0 times.

When it is less than 5.5, an area shrinkage is less than 80% and a contact-packaging for an irregular shaped container is not satisfactorily attained. On the contrary, when it is greater than 7.0, a tearing and a whitening of the film is caused in the stretching operation and a practically valuable film is not obtained.

In order to attain suitable contact-packaging on all surfaces of an irregular shaped container, it is necessary to stretch biaxially at a stretch ratio of greater than 1.5 times in each direction. When a stretch ratio is less than 1.5 times in either direction, a shrinkage in one direction is short. When an irregular shaped container such as a cup packed by the contact-packaging in the heat shrinking packaging, an non-contacted part of the film is partially remained as a lip or creases. Accordingly, the stretch ratio is greater than 1.5 times in both directions to prepare the biaxially stretched film.

It is preferable to give the area shrinkage of more than 80% and each shrinkage of more than 30% especially more than 40% in one direction which may be attained by stretching the specific film at a total of stretch ratios of more than about 5.5.

The resulting highly heat shrinkable polyvinyl chloride film has high shrinkage and excellent optical characteristics and it can be used for a heat shrinking package for a complicate shaped container, a large container or a bottle in excellent appearance because of a contact-packaging.

The highly heat shrinkable polyvinyl chloride film having a shrinkage of more than 60% in one direction can be used for a contact-packaging with sleeve. The film is bonded to form a cylindrical film which has high shrinkage in diameter and an article is covered with the cylindrical film and then the film is heated to shrink in diameter. This is suitable for forming a label on a body of a bottle having a neck. The bonding of the film in the cylindrical film can be made with a binder or a heat cut of overlapping part of the film.

The high heat shrinkable polyvinyl chloride film having a shrinkage of more than 80% of an area shrinkage can be used for a contact-packaging in seal. The film is bonded in all of opening sides to seal an article in the film. The bonding of the film can be made by a heat cut of overlapping part of the film. The film is heated to shrink in biaxial direction. This is suitable for packaging various article in tight without excess space.

The present invention will be further illustrated by certain examples and references which are provided for purposes of illustration only and are not intended to be limiting the present invention.

In the examples, the measurements were carried out by the following methods.

(i) Shrinkage:

Lines having a length of 100 mm were drawn at a center in longitudinal direction (take-up direction) and in transversal direction (perpendicular direction) on square sampler each having a 120 mm.

Each sample was heated in a glycerin bath at 100° C. for 5 minutes and each length of the line was measured as l(mm) and each shrinkage was calculated by the equation:

shrinkage (%) = 100 − l/100 × 100.

(ii) Area shrinkage:

Lines having a length of 100 mm were drawn at a center in longitudinal direction (take-up direction) and in transversal direction (perpendicular direction) on square sampler each having a length of 120 mm.

Each sample was heated in a glycerin bath at 100° C. for 5 minutes and each length of the line in longitudinal direction was measured as $l^{MD}$ (mm) and each length of the line in transversal direction was measured as $l^{TD}$ (mm) and each area shrinkage was calculated by the equation:

$$\text{area shrinkage} = \frac{100 \times 100 - l^{MD} \times l^{TD}}{100 \times 100} \times 100.$$

(iii) Haze:

Haze was measured by Japanese Industrial Standard K-6718.

(iv) Glossiness:

Glossiness was measured by Japanese Industrial Standard Z-8741.

EXAMPLE 1

100 Wt. parts of homopolymer of vinyl chloride having an average polymerization degree of 800 and a density of 1.38 g/cm$^3$ was admixed with 4 wt. parts of dibutyl tin maleate, 0.7 wt. part a lubricant and 15 wt. parts of a plasticizer and then, 14 wt. parts of a vinyl chloride-vinyl acetate copolymer comprising 10 wt.% of vinyl acetate content and an average polymerization degree 800 was blended. The mixture was melt-extruded to form a sheet and each sheet was stretched in a tenter having a preheating zone at 95° C. and a stretching zone at 85° C. at a stretch ratio of 3.5 to 5.0 times in transversal direction as a uniaxial stretching to obtain films having a thickness of 40μ.

Shrinkages, optical characteristics and stretching properties of the sample films are shown in Table 1.

Reference 1

The sheet obtained in the process of Example 1 was stretched at a stretch ratio of 3.2 times in transversal direction to obtain a film having a thickness of 40μ.

Shrinkages, optical characteristics and stretching properties of the sample films are also shown in Table 1.

Reference 2

The homopolymer of vinyl chloride and the additives of Example 1 were admixed without blending the vinyl chloride-vinyl acetate copolymer.

The mixture was melt-extruded to form a sheet and each sheet was stretched in transversal direction at a stretch ratio of 3.5 to 4.5 times under the conditions of Example 1 to obtain films having a thickness of 40μ.

Shrinkages, optical characteristics and stretching properties of the sample films are shown in Table 1.

TABLE 1

|  | Stretch ratio in trans. (times) | Shrinkage in trans. (%) | Optical Haze (%) | Glossiness (%) | Stretching property |
|---|---|---|---|---|---|
|  | 3.5 | 63 | 1.1 | 191 | good |
|  | 4.0 | 66 | 1.7 | 183 | " |
| Example 1 | 4.5 | 67 | 1.9 | 176 | " |
|  | 5.0 | 69 | 3.5 | 170 | slightly |

TABLE 1-continued

|  | Stretch ratio in trans. (times) | Shrinkage in trans. (%) | Optical Haze (%) | Glossiness (%) | Stretching property |
|---|---|---|---|---|---|
| Reference 1 | 3.2 | 58 | 0.9 | 183 | whitening good |
|  | 3.5 | 64 | 4.8 | 166 | whitening |
| Reference 2 | 4.0 | 66 | 11.3 | 143 | " |
|  | 4.5 | — | — | — | tearing |

Table 1 shows the following facts.

As shown in Reference 1, when the stretch ratio is less than 3.5 times, a stretching operation can be smoothly performed, but the shrinkage is lower than 60%.

As shown in Reference 2, when the vinyl chloride-vinyl acetate copolymer is not incorporated, a whitening or a tearing of the film is caused at relatively low stretch ratio in the stretching operation.

As shown in Example 1, when the sheet comprising 14 wt. parts of the vinyl chloride-vinyl acetate copolymer is stretched at a stretch ratio of 3.5 to 5.0 times especially 3.5 to 4.5, the stretching operation is smoothly performed and films having a shrinkage of higher than 60% and excellent optical characteristics as low haze and high glossiness can be obtained.

EXAMPLE 2

100 Wt. parts of homopolymer of vinyl chloride having an average polymerization degree of 800, a density of 1.38 g/cm$^3$ was admixed with 4 wt. parts of dibutyl tin maleate, 0.7 wt. part of a lubricant, and 15 wt. parts of a plasticizer and then, 14 wt. parts of a vinyl chloride-vinyl acetate copolymer comprising 10–15 wt.% of vinyl acetate content was blended. Each mixture was melt-extruded to form a sheet and each sheet was stretched in a tenter having a preheating zone at 95° C. and a stretching zone at 85° C. at a stretch ratio of 3.5 to 4.5 times in transversal direction as a uniaxial stretching.

Shrinkages and stretching properties of the sample films are shown in Table 2.

Reference 3

In accordance with the process of Example 2 except varying the copolymer to the vinyl chloride-vinyl acetate copolymer having an average polymerization degree of 550 to 600 and a vinyl acetate content of 3 wt.%, the films were prepared and tested. The results are shown in Table 2.

TABLE 2

|  | Vinyl chloride-vinyl acetate copolymer | | Stretching property | | |
|---|---|---|---|---|---|
|  | Ave. polymerization degree | VAc content (wt. %) | 3.5 times | 4 times | 4.5 times |
| Exp. 2 | 700 | 15 | good | good | good |
|  | 800 | 10 | " | " | " |
|  | 800 | 15 | " | " | " |
| Ref. 3 | 550 | 15 | " | tear | tear |
|  | 600 | 10 | " | " | " |
|  | 700 | 3 | tear | " | " |

As shown in Table 2, only when the vinyl chloride-vinyl acetate copolymers having an average polymerization degree of more than 700 and a vinyl acetate content of 10 to 15 wt.% were used, the films could be stretched at high ratio. When the other copolymers were used, a desired stretching could not be attained.

EXAMPLE 3

100 Wt. parts of homopolymer of vinyl chloride having an average polymerization degree of 800, a density of 1.38 g/cm$^3$ was admixed with 4 wt. parts of dibutyl tin maleate, 0.7 wt. part of a lubricant, and 10 to 17 wt. part of a plasticizer and 5 to 20 wt. parts of a vinyl chloride-vinyl acetate copolymer having an average polymerization degree of 800 and a vinyl acetate content of 15 wt.% was blended. Each mixture was melt-extruded to form a sheet and each sheet was stretched by a tenter having a preheating zone at 95° C. and a stretching zone at 85° C. at stretch ratio of 3.5 to 4.5 times in transversal direction as a uniaxial stretching.

Shrinkages and stretching properties of the sample films are shown in Table 3.

Reference 4

In accordance with the process of Example 3 except using each sheet prepared by incorporating no copolymer or 25 wt. parts of the vinyl chloride-vinyl acetate copolymer, each sheet was stretched in transversal direction as a uniaxial stretching. The results are shown in Table 3.

The softening temperature of films measured by JIS K-6745 was 43° C. in the tests in Table 3.

TABLE 3

|  | Vinyl chloride-vinyl acetate copolymer | | Stretching property | | |
|---|---|---|---|---|---|
|  | Amount (wt. parts) | Plasticizer (wt. parts) | 3.5 times | 4 times | 4.5 times in part |
| Example 3 | 5 | 11 | good | good | tear in part |
|  | 10 | 12 | " | " | good |
|  | 15 | 14 | " | " | " |
|  | 20 | 15 | " | " | tear in part |
| Reference 4 | 0 | 10 | whiten | whiten | tear |
|  | 25 | 17 | good | tear in part | tear |

As shown in Table 3, when the specific vinyl chloride-vinyl acetate copolymer was not added or added at more than 20 wt. parts, the whitening or the tearing was caused at relatively low stretch ratio. It is preferable to incorporate 5 to 20 wt. parts of the special vinyl chloride-vinyl acetate copolymer as Example 3.

EXAMPLE 4

Each sheet obtained in the process of Example 1 was stretched in a longitudinal stretching machine having preheating rolls at 50° C., stretching rolls at 70° C. and cooling rolls at 40° C. at a stretch ratio of 2.0 to 3.0 times in longitudinal direction and then, it was stretched in a tenter having a preheating zone at 95° C. and a stretching zone at 85° C. at a stretch ratio of 2.0 to 5.0 times in transversal direction and at a total of the stretch ratio in longitudinal direction and the stretch ratio in transversal direction of 5.5 to 7.5 times to obtain films having a thickness of 40μ.

Area shrinkages and optical characteristics of the sample films were measured. The results are shown in Table 4.

Reference 5

The sheet obtained in the process of Example 1 was stretched under substantially same condition except at a total of the stretch ratio in longitudinal direction and the stretch ratio in transversal direction is 5.0 or 7.2 to obtain films having a thickness of 40μ.

Area shrinkage and optical characteristics of the sample films were measured. The results are shown in Table 4.

Reference 6

The homopolymer of vinyl chloride and the additives of Example 1 were admixed without blending the vinyl chloride-vinyl acetate copolymer.

The mixture was melt-extruded to form a sheet and each sheet was stretched at a stretched ratio of 2.0 to 2.5 times in longitudinal direction and further stretched at a stretched ratio of 3.0 to 4.0 times in transversal direction and at a total of the stretch ratios of 5.5 to 6.0 times under the condition Example 4 to obtain films having a thickness of 40μ.

Area shrinkages and optical characteristics of the sample films were measured. The results are shown in Table 4.

TABLE 4

| | Stretch Ratio | | | Area Shrink. | Optical characteristic | | Stretch |
|---|---|---|---|---|---|---|---|
| | Long. | Trans. | Total | | Haze (%) | Gloss (%) | |
| | 2.8 | 2.8 | 5.6 | 80 | 1.1 | 190 | good |
| | 2.0 | 4.0 | 6.0 | 80 | 1.1 | 191 | good |
| Ex. 4 | 3.0 | 3.0 | 6.0 | 81 | 1.2 | 188 | good |
| | 3.0 | 3.5 | 6.5 | 86 | 1.3 | 185 | good |
| | 3.0 | 4.0 | 7.0 | 88 | 2.7 | 164 | good |
| Reference 5 | 2.0 | 3.0 | 5.0 | 76 | 1.0 | 190 | good |
| | 3.0 | 4.5 | 7.5 | — | — | — | tear |
| Reference 6 | 2.5 | 3.0 | 5.5 | 80 | 4.2 | 164 | white |
| | 2.0 | 4.0 | 6.0 | — | — | — | tear |

Note:
Long.: longitudinal
Trans.: transversal
Area Shrink.: Area shrinkage

Table 4 shows the following facts.

As shown in Reference 5, when a total of the stretch ratios is less than 5.5 times, a stretching operation can be smoothly performed but the area shrinkage is less than 80%. On the contrary, when it is greater than 7, a whitening or a tearing of the film is caused in the stretching operation.

As shown in Reference 6, when the vinyl chloride-vinyl acetate copolymer is not incorporated, a whitening or a tearing of the film is caused at relatively low stretch ratio in the stretching operation.

As shown in Example 4, when the sheet comprising 14 wt. parts of the vinyl chloride-vinyl acetate copolymer is stretched at a total of the stretch ratios of 5.5 to 7 times, the stretching operation is smoothly performed and films having an area shrinkage of higher than 80 wt.% and excellent optical characteristics as low haze and high glossiness can be obtained.

EXAMPLE 5

Each sheet obtained in the process of Example 2 was stretched in a longitudinal stretching machine having preheating rolls at 50° C., stretching rolls at 70° C. and cooling rolls at 40° C. and then, it was stretched in a tenter having a preheating zone at 95° C. and a stretching zone at 85° C. at a total of stretch ratios in longitudinal direction and in transversal direction of 6 to 7 and stretching properties and area shrinkages were measured. The results are shown in Table 5.

Reference 7

In accordance with the process of Example 5 except varying the copolymer to the vinyl chloride-vinyl acetate copolymer having an average polymerization degree of 550 to 600 and a vinyl acetate content of 3 wt.%, the film were prepared and tested. The results are shown in Table 5.

TABLE 5

| | Vinyl chloride-vinyl acetate copolymer | | Stretching property | | |
|---|---|---|---|---|---|
| | Ave. polymerization degree | VAc content (wt. %) | 6 times | 6.5 times | 7 times |
| Example 5 | 700 | 15 | good | good | good |
| | 800 | 10 | " | " | " |
| | 800 | 15 | " | " | " |
| Reference 7 | 550 | 15 | tear | tear | tear |
| | 600 | 10 | " | " | " |
| | 700 | 3 | " | " | " |

As shown in Table 5, only when the vinyl chloride-vinyl acetate copolymers having an average polymerization degree of more than 700 and a vinyl acetate content of 10 to 15 wt.% were used, the films could be stretched at high ratio.

EXAMPLE 6

Each sheet obtained in the process of Example 3 was stretched in a longitudinal stretching machine having a preheating rolls at 50° C., stretching rolls at 70° C. and cooling rolls at 40° C. and then, it was stretched in a tenter having a preheating zone at 95° C. and a stretching zone at 85° C. at a total of stretch ratios in longitudinal direction and in trnsversal direction of 6 to 7 and stretching properties were determined. The results are shown in Table 6.

Reference 8

In accordance with the process of Example 6 except varying each sheet prepared by incorporating no copolymer or 25 wt. parts of the vinyl chloride-vinyl acetate copolymer, each sheet was stretched in longitudinal and transversal directions. The results are shown in Table 6.

The softening temperature of film measured by JIS K-6745 was 43° C. in the tests in Table 6.

TABLE 6

| | Vinyl chloride-vinyl acetate copolymer Amount (wt. parts) | Plasticizer (wt. parts) | Stretching property | | |
|---|---|---|---|---|---|
| | | | 6 times | 6.5 times | 7 times |
| Example 6 | 5 | 11 | good | good | tear in part |
| | 10 | 12 | " | " | good |
| | 15 | 14 | " | " | " |
| | 20 | 15 | " | " | " |
| Reference 8 | 0 | 10 | tear | tear | tear |
| | 25 | 17 | tear in part | " | " |

As shown in Table 6, when the specific vinyl chloride-vinyl acetate copolymer was not added or added at more than 20 wt. parts, the whitening or the tearing was caused at relatively low stretch ratio. It is preferable to incorporate 5 to 20 wt. parts of the special vinyl chloride-vinyl acetate copolymer as Example 6.

What is claimed is:

1. A highly heat shrinkable polyvinyl chloride film which shrinks more than 60% in one direction prepared by uniaxially stretching a film comprising 5 to 20 parts by weight of a vinyl chloride-vinyl acetate copolymer having a vinyl acetate content of 10 to 15% and an average polymerization degree of more than 700 and 100 parts by weight of polyvinyl chloride, wherein said film has been stretched at a stretch ratio of 3.5 to 5 times in one direction and at a stretch ratio of less than 1.5 times in the perpendicular direction.

2. A highly heat shrinkable polyvinyl chloride film according to claim 1 which has been stretched in a stretching zone at 60° C. to 100° C.

3. A highly heat shrinkable polyvinyl chloride film according to claim 1, wherein said film is in the form of a cylinder and wherein the diameter of said cylinder is reduced when the film is heat shrunk.

4. A highly heat shrinkable polyvinyl chloride film which shrinks more than 80% in area prepared by biaxially stretching a film comprising 5 to 20 parts by weight of a vinyl chloride-vinyl acetate copolymer having a vinyl acetate content of 10 to 15% and an average polymerization degree of more than 700 and 100 parts by weight of polyvinyl chloride, wherein said film has been stretched at a total of stretch ratios in longitudinal direction and in transversal direction of 5.5 to 7.0 times, and at a stretch ratio of at least 1.5 times in each direction.

5. A highly heat shrinkable polyvinyl chloride film according to claim 4 which has been stretched in a stretching zone at 60° C. to 100° C.

6. A highly heat shrinkable polyvinyl chloride film according to claim 4, wherein said film encloses an article to be sealed within the film.

* * * * *